United States Patent
Taubenheim et al.

(10) Patent No.: US 7,369,524 B2
(45) Date of Patent: May 6, 2008

(54) METHOD AND APPARATUS FOR TRANSMITTING LOCATION DATA WITHIN A COMMUNICATION SYSTEM

(75) Inventors: David B. Taubenheim, Plantation, FL (US); Spyros Kyperountas, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 352 days.

(21) Appl. No.: 11/077,311

(22) Filed: Mar. 10, 2005

(65) Prior Publication Data
US 2006/0203762 A1   Sep. 14, 2006

(51) Int. Cl.
  *H04Q 7/00* (2006.01)
  *H04Q 7/20* (2006.01)
(52) U.S. Cl. .................. 370/328; 370/310.2; 370/310; 370/338; 370/395.1; 455/456.1; 455/404.2; 455/456.3; 455/457
(58) Field of Classification Search ................ 870/328, 870/310.2, 338, 345; 455/404.2, 456.1, 456.3, 455/457; 370/352, 353, 395.1
See application file for complete search history.

(56) References Cited

U.S. PATENT DOCUMENTS

| | | | |
|---|---|---|---|
| 5,910,947 A * | 6/1999 | Futamura | ................. 370/332 |
| 6,249,252 B1 | 6/2001 | Dupray | |
| 7,188,026 B2 * | 3/2007 | Tzamaloukas | ............... 701/200 |
| 7,236,879 B2 * | 6/2007 | Tsunehara et al. | .......... 701/207 |
| 2001/0046870 A1 * | 11/2001 | Stilp et al. | ................... 455/456 |
| 2003/0109266 A1 * | 6/2003 | Rafiah et al. | ............... 455/456 |
| 2003/0216144 A1 * | 11/2003 | Roese et al. | ............. 455/456.1 |
| 2004/0192353 A1 | 9/2004 | Mason, et al. | |
| 2004/0203870 A1 | 10/2004 | Aljadeff, et al. | |
| 2004/0219930 A1 * | 11/2004 | Lin | ......................... 455/456.1 |
| 2005/0063318 A1 * | 3/2005 | Xu et al. | ..................... 370/254 |
| 2005/0136895 A1 * | 6/2005 | Thenthiruperai et al. | 455/412.2 |
| 2006/0052115 A1 * | 3/2006 | Khushu | ................... 455/456.3 |

* cited by examiner

*Primary Examiner*—George Eng
*Assistant Examiner*—Huy Phan

(57) ABSTRACT

To enable wireless applications which require the use of location information, a method and apparatus for transmitting location data within an ad-hoc communication system is provided herein. During operation, a portion of a packet payload is used to transmit location coordinate information along with an identifier of location estimation technique utilized for a node, as well as other parameters that may be needed for location estimation. Nodes in the communication system calculate their location coordinates using the said portion of packets received from other nodes in the communication system.

12 Claims, 8 Drawing Sheets

500

US 7,369,524 B2

METHOD AND APPARATUS FOR TRANSMITTING LOCATION DATA WITHIN A COMMUNICATION SYSTEM

FIELD OF THE INVENTION

The present invention relates generally to communication systems and in particular, to a method and apparatus for transmitting location data within an ad-hoc communication system.

BACKGROUND OF THE INVENTION

In many wireless communication systems, a node within the system will need to determine its location. Nodes determining, or estimating, their locations will be capable of utilizing any one of multiple location estimation techniques, depending on the various requirements of the node (e.g., desired location accuracy, computational intensity, tracking capabilities, . . . , etc.). Such location estimation techniques include solutions such as weighted-average location techniques, path loss techniques, a global-positioning system (GPS) technique, Time-Difference of Arrival (TDOA) techniques, . . . , etc.

One location-estimation technique that may be utilized by nodes is a maximum-likelihood (ML) based relative location algorithm such as that described in U.S. Pat. No. 6,473,038. This technique allows a node wishing to determine its location itself to utilize location estimates of other nodes in an iterative process. It is important for a node utilizing an ML-based location technique to know the location estimation techniques used by its neighbors. This is because the ML cost function is a global problem solved in a distributed manner by nodes in the communication system. Therefore, each individual node solves a piece of a bigger optimization problem. If one of a node's neighbors uses a nearest-neighbor technique to calculate its location, perhaps as required by an application, then the resulting location error that would be passed on through coordinate sharing could be very large. Such an error would propagate through the other nodes that use ML to estimate their location, potentially lowering the accuracy of any location estimate in the system.

Thus, in a network with multiple location solutions, it is imperative that nodes have a way to identify the location estimation technique used to obtain the coordinates being exchanged. Therefore, a need exists for a method and apparatus for transmitting location data within a communication system that allows a node participating in location estimation to utilize an appropriate subset of location coordinates received from other nodes.

DETAILED DESCRIPTION OF THE DRAWINGS

To address the above-mentioned need, a method and apparatus for transmitting location data within a communication system is provided herein. During operation, a portion of a packet's payload transmitted by a node is utilized for location coordinates along with an identifier of the location estimation technique utilized. Because nodes may transmit an identifier of the technique utilized in determining their location along with their estimated coordinates, nodes utilizing a particular location estimation technique will have a way to identify that technique when exchanging their coordinate information.

The present invention encompasses a method for transmitting location data. The method comprises the steps of performing location estimation, determining a technique utilized for performing the location estimation, and transmitting the location estimation and information related to the technique utilized for performing the location estimation to nodes within a communication system.

The present invention additionally encompasses a method comprising the steps of determining a location of a node within an ad-hoc communication system, determining a technique utilized for performing the location of the node, and utilizing the location of the node to calculate a location only when the technique utilized for performing the location belongs to a set of predetermined techniques.

Finally, the present invention encompasses an apparatus comprising location finding equipment for performing a location estimate, logic circuitry for determining a technique utilized for performing the location estimate, and transmitting circuitry for transmitting the location estimate and information related to the technique utilized for performing the location estimate.

Figure 1:
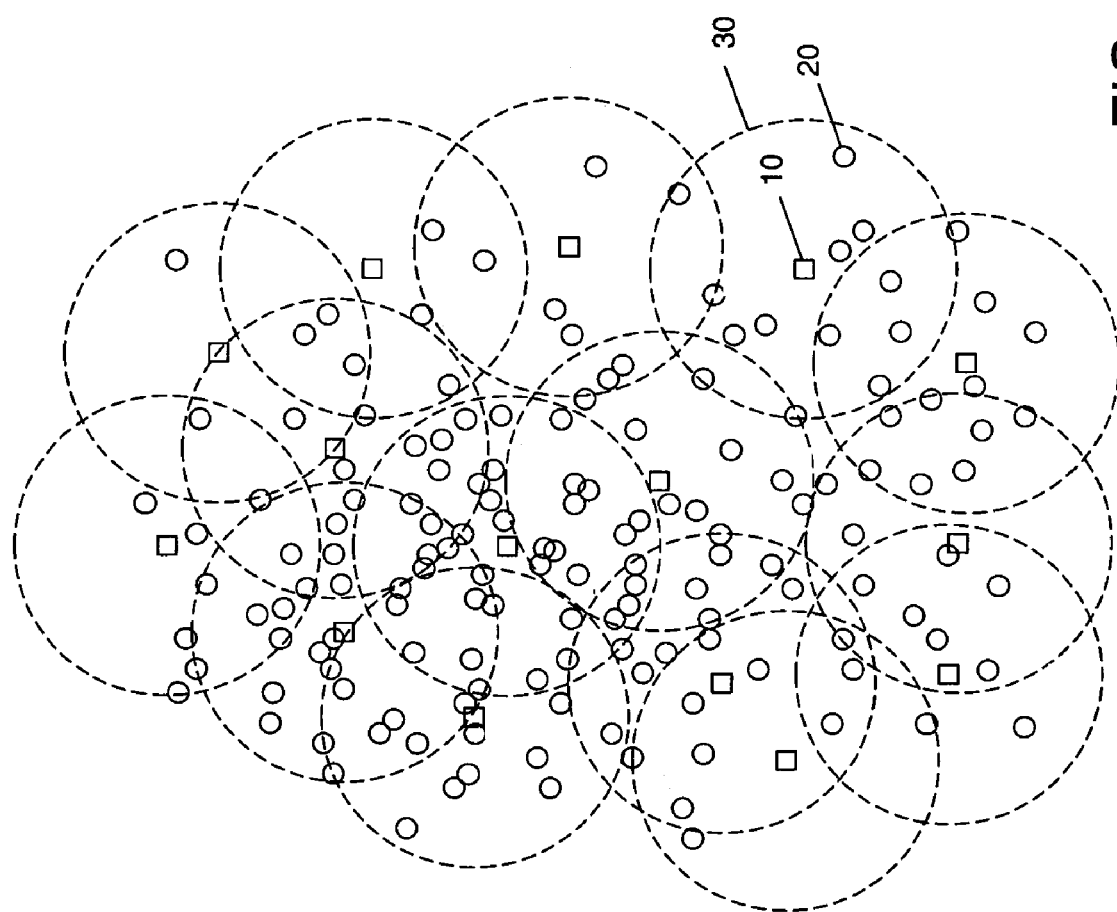
FIG. 1 is a block diagram of a communication system.

Turning now to the drawings, wherein like numerals designate like components, FIG. 1 illustrates communication system 100 in accordance with a preferred embodiment of the present invention. Communication system 100 preferably utilizes an ad-hoc communication system protocol defined by 802.15.3 Wireless Personal Area Networks for High Data Rates or IEEE 802.15.4 Low Rate Wireless Personal Area Networks. However one of ordinary skill in the art will recognize that other communication system protocols may be utilized without varying from the scope of the invention. For example, communication system 100 may utilize communication system protocols such as, but not limited to, Ad-hoc On Demand Distance Vector Routing (AODV), Dynamic Source Routing (DSR), Temporally-Ordered Routing Algorithm (TORA), Bluetooth™ standard (IEEE Standard 802.15.1), . . . , etc.

As shown, communication system 100 preferably includes a number of piconets, each comprising a coordinating device 10 and a larger number of slave nodes 20 in communication with coordinating device 10. Nodes 20 represent devices that communicate with each other through synchronization provided by coordinating devices 10. Nodes 20 can be transportable (mobile) or they can be fixed in a given place.

Figure 2:
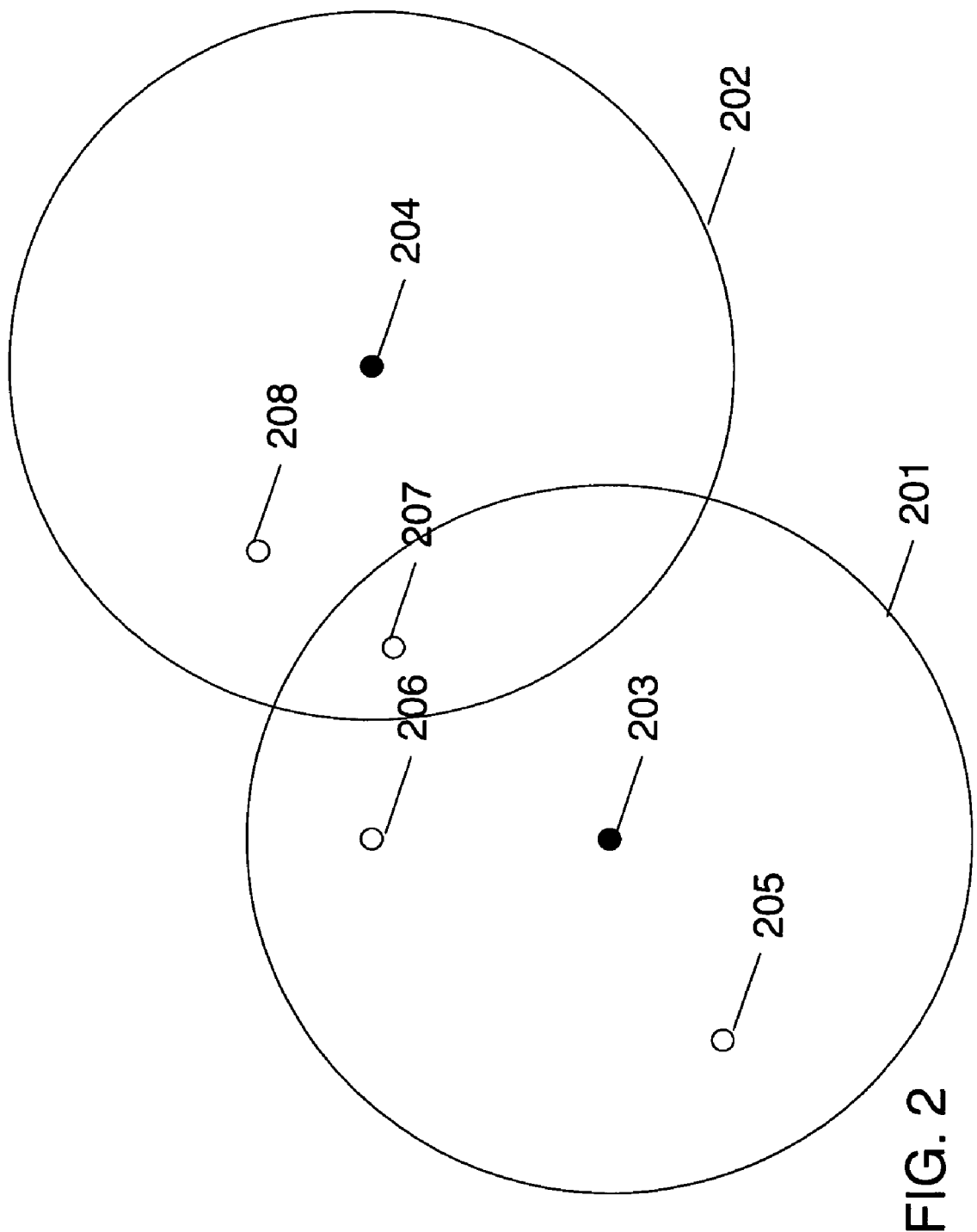
FIG. 2 is a more-detailed block diagram of the communication system of FIG. 1.
Figure 3:
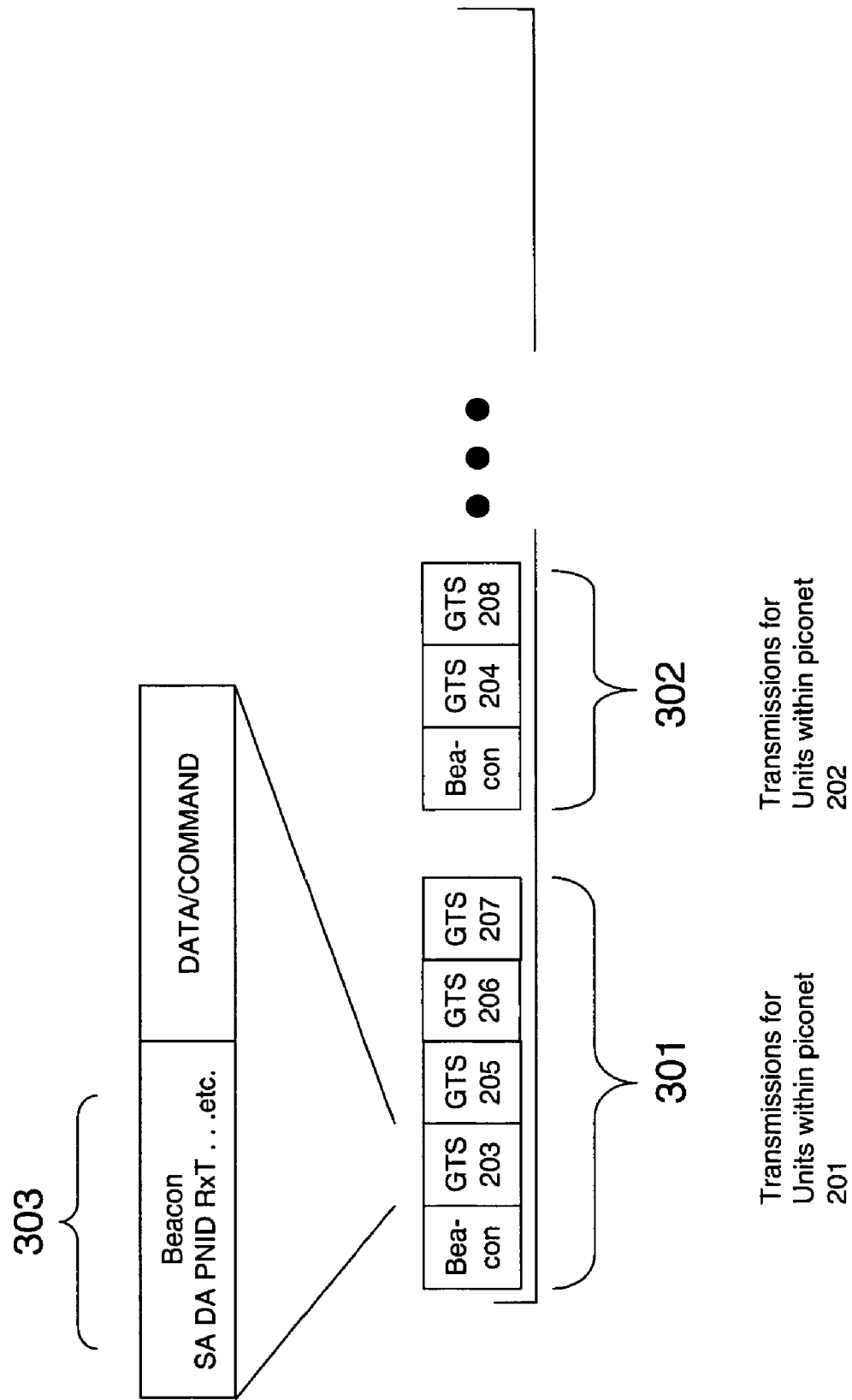
FIG. 3 illustrates a transmission scheme for the communication system of FIG. 1.

Prior to describing techniques for determining, or estimating, a node's location, and then transmitting the location coordinates and an identifier of the location estimation technique utilized, it is necessary to set forth background information with reference to FIG. 2 and FIG. 3. In particular, FIG. 2 is a more-detailed view of system 100, showing two piconets 201 and 202 having respective controllers 203 and 204. In this illustration, nodes 205-207 are associated with controller 203 (piconet 201), while node 208 is associated with controller 204 (piconet 202).

FIG. 3 illustrates a transmission scheme for the communication system of FIG. 2. During communication among devices 201-208, a specific transmission protocol is utilized by communication system 100 wherein each piconet communicates within a particular non-overlapping superframe 301, 302 as described in U.S. patent application Ser. No. 10/414,838, which is incorporated by reference herein. With reference to FIG. 2, piconet 201 completes all necessary transmissions within superframe 301, while piconet 202 completes all necessary transmissions within superframe 302. During a superframe, a particular controller of the piconets will broadcast piconet timing and control information within a beacon field, while each node (including the controller) will have a Contention Free Period slot, part of the Channel Time Allocation (CTA) facility of the IEEE 802.15.3 standard, for transmission. During its guaranteed time slot (GTS), a particular node broadcasts any command (COM) wishing to be executed to any particular node or may send data intended for a single node or set of nodes.

During the time slot, the node also broadcasts a beacon comprising identification of the piconet(s) the node is associated with (i.e., a piconet identifier (PNID)), along with a source address (SA, or device identifier (DEVID)), a destination address (DA or DEVID), and a receive time (RxT) when the node can receive other node's transmissions. This is illustrated in FIG. 3 with the expanded view of the GTS for node 205. It should be noted that although FIG. 3 shows the beacon signal comprising SA, DA, PNID, and RxT, one of ordinary skill in the art will recognize that the beacon signal may comprise other elements such as, but not limited to, the byte length of the frame being used, a beacon payload that can be used to broadcast generic data . . . etc. Furthermore, it is recognized that data packets that are not beacons may also be used to carry location information in such a communication system. Such data packets may be additionally transmitted within the GTS for a particular node.

As discussed above, it is imperative that nodes utilizing an iterative location estimation technique have a way to identify the technique when exchanging their coordinate information. In order to address this need, a portion of a transmitted packet is used to contain location coordinates along with an identifier of the location estimation technique utilized by a node. The packet may be transmitted within a nodes beacon, or alternatively simply transmitted within a nodes GTS.

Figure 4:
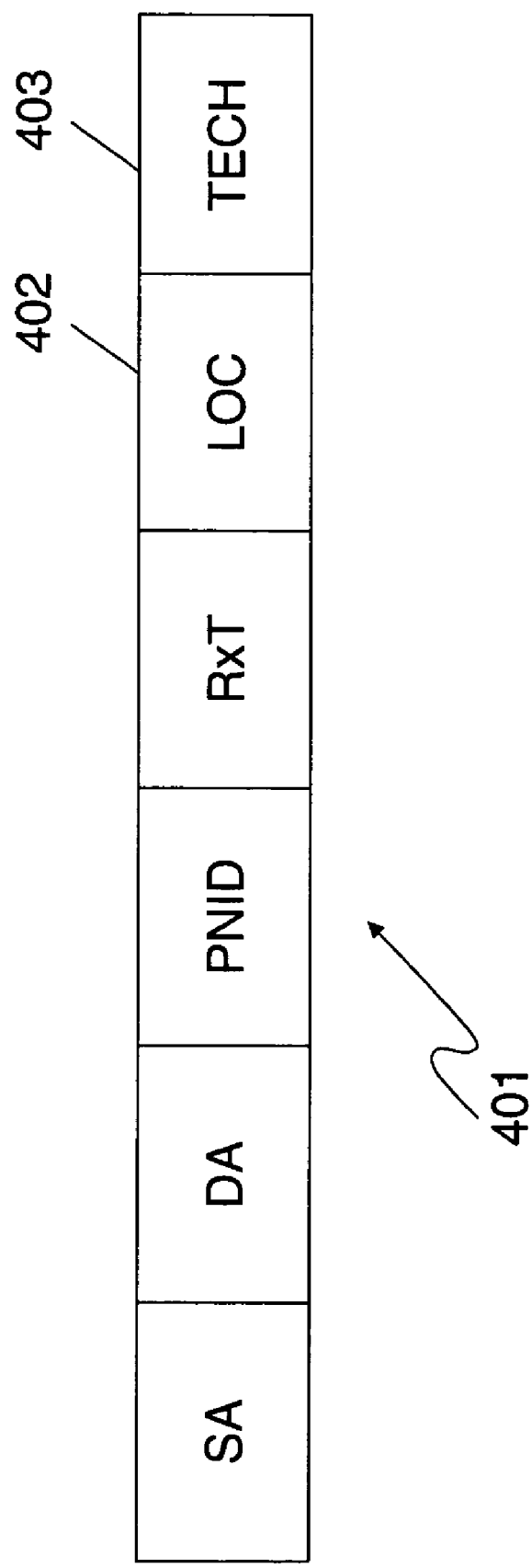
FIG. 4 illustrates a packet transmission.

FIG. 4 illustrates packet 401 that incorporates location coordinate (LOC) 402 along with an identifier of the location technique (TECH) 403 utilized to determine location coordinate 402. As is evident, packet 401 also preferably includes SA, DA, PNID, and RxT. It should be noted that TECH field 403 may comprise any information that identifies the location technique utilized. For example, a node in a communication system may have ten location estimation techniques at its disposal, each being identified with a value from 1-10. Thus, values for TECH 403 in this scenario will range from 1-10 with each identifying a unique location technique. Therefore, in communication system 100 nodes will include their estimated location (e.g. x, y, z coordinates) 402 along with a location technique identifier 403 utilized in their packet transmissions. Upon receiving packets from other nodes, a node wishing to perform a location estimate can utilize this information in determining its location. More particularly, a node within range will receive packets and store the location coordinates along with an identifier of the location technique utilized by the transmitting node. A node preferably will select its location estimation technique based at least on the received identifier. Once a node's own location has been satisfactorily determined, the node will include the location coordinates along with an identifier of the location technique utilized in its own transmitted packets.

For an ML-based location technique, the process may be iterative. That is, nodes estimate their own locations with a set of augmented location information received from other nodes, and then transmit packets containing at least their location and location estimation technique identifier. Other nodes receive these packets and refine their position estimate using the new information transmitted by other nodes. The process then repeats.

Figure 5:
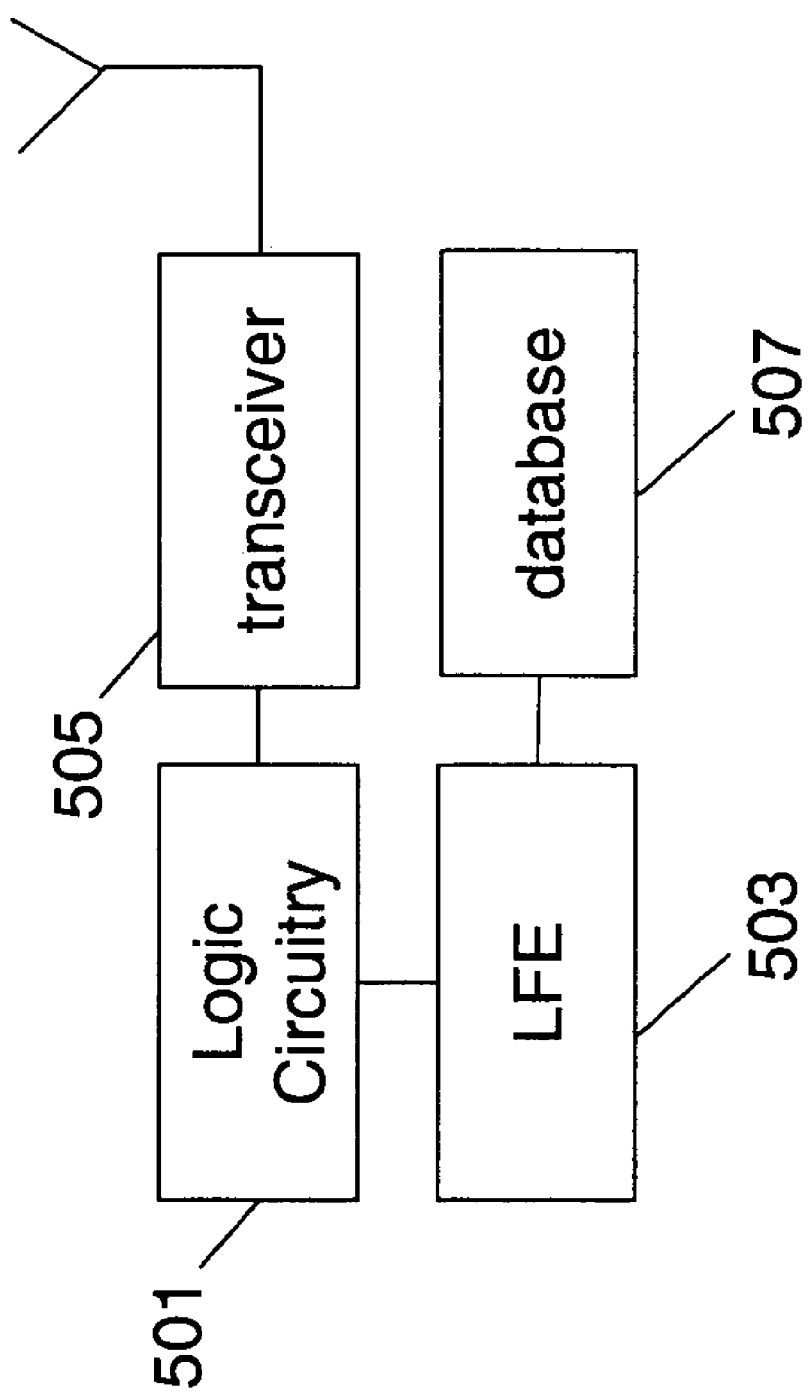
FIG. 5 is a block diagram of a node within the communication system of FIG. 1.

FIG. 5 is a block diagram of node 500. As is evident, node 500 comprises logic circuitry 501, location-finding equipment (LFE) 503, and transmitter/receiver (transceiver) 505. During operation, logic circuitry 501 instructs LFE 503 to estimate a location. As discussed above, this location estimate may be obtained by one of several existing techniques. For example, LFE 503 may comprise a GPS receiver that accurately obtains the node's location. Alternatively, LFE 503 may simply be circuitry designed to calculate a location based on a Time-Difference of Arrival (TDOA) technique by analyzing propagation delays from nodes with accurate, or known, locations. Regardless of the location technique utilized, LOC field 402 and TECH field 403 will be populated. The LOC and TECH fields will aide in subsequent location estimates by other nodes. For example, when a node is utilizing an ML-based technique to perform a location estimate, any received coordinate information will not be utilized if TECH field 403 does not indicate that the technique is appropriate as a basis for ML location estimation.

Regardless of the location technique used for node 500, once the location is known, LFE 503 passes this information along with the technique utilized to logic circuitry 501, where they are placed within a packet, passed to transceiver 505, and transmitted as described above. Because nodes will transmit an identifier of the technique utilized in estimating their location along with their location coordinates, a node utilizing the ML-based technique, for example, will have a way to select the appropriate subset of received node locations and the appropriate location technique.

Figure 6:
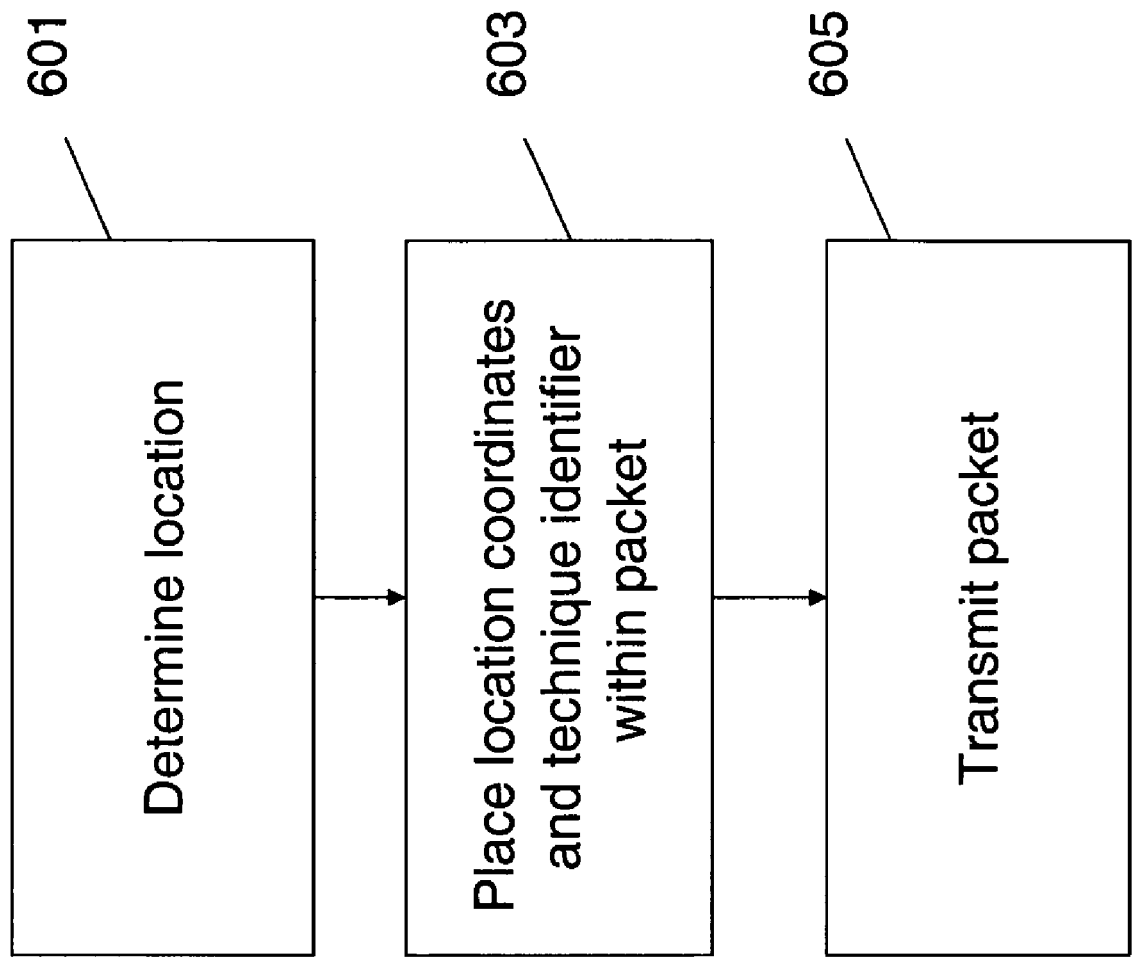
FIG. 6 is a flow chart showing operation of the node of FIG. 5.

FIG. 6 is a flow chart showing operation of the node of FIG. 5. The logic flow begins at step 601 where LFE 503 selects a technique to estimate the node's location and subsequently performs the location estimation. The technique may be one of any known location techniques, such as, but not limited to a manually measured technique, a weighted-average location technique, a path loss technique, a GPS technique, a Time-of Arrival (TOA) or Time-Difference of Arrival (TDOA) technique, a maximum-likelihood (ML) based technique, a closest neighbor technique, an Angle of Arrival Technique, a signal environment fingerprinting technique, or a multi-lateration technique.

Regardless of the technique utilized for determining a location estimate, the resulting location estimate is passed to logic circuitry 501 where logic circuitry 501 determines when the packet transmission will take place, determines the technique utilized for performing the location estimation, and places the location estimate along with an identifier of the location technique utilized into a packet transmission (step 603). Logic circuitry 501 passes the packet to transceiver 505 where it is transmitted (step 605). Thus, at step 605, the location estimate and information related to the technique utilized for performing the location estimate are transmitted to nodes within the communication system.

Transmission of the location estimate and the technique is accomplished by transmitting them within a packet that may, or may not be a beacon 303.

As discussed above, in many location estimation techniques, a node may have to obtain location coordinates and location technique information from other nodes in order to determine its location. For this to happen, the node must receive coordinate/technique data by analyzing a packet transmission. Thus, for a first node to receive a second node's location and technique, the first node must activate its receiver during the second node's packet transmission. In order to accomplish this, the first node must be made aware of when the second node will be transmitting its beacon. This could be accomplished in many different ways, one of which is by looking up the timing of the second node's packet in the neighbors list that was created by listening to the channel for at least a superframe. Another way is to listen to the channel for the whole superframe and hear all of the neighboring nodes' packets with their location and location technique information. Yet another way is for the packet timing to be predetermined. Regardless of how the first node becomes aware of the second node's beacon transmissions, the first node awakes and listens for the second node's packet to obtain location/location technique information. Once the location and technique of the second node is determined, the first node can then utilize this information in performing any location estimate.

Figure 7:
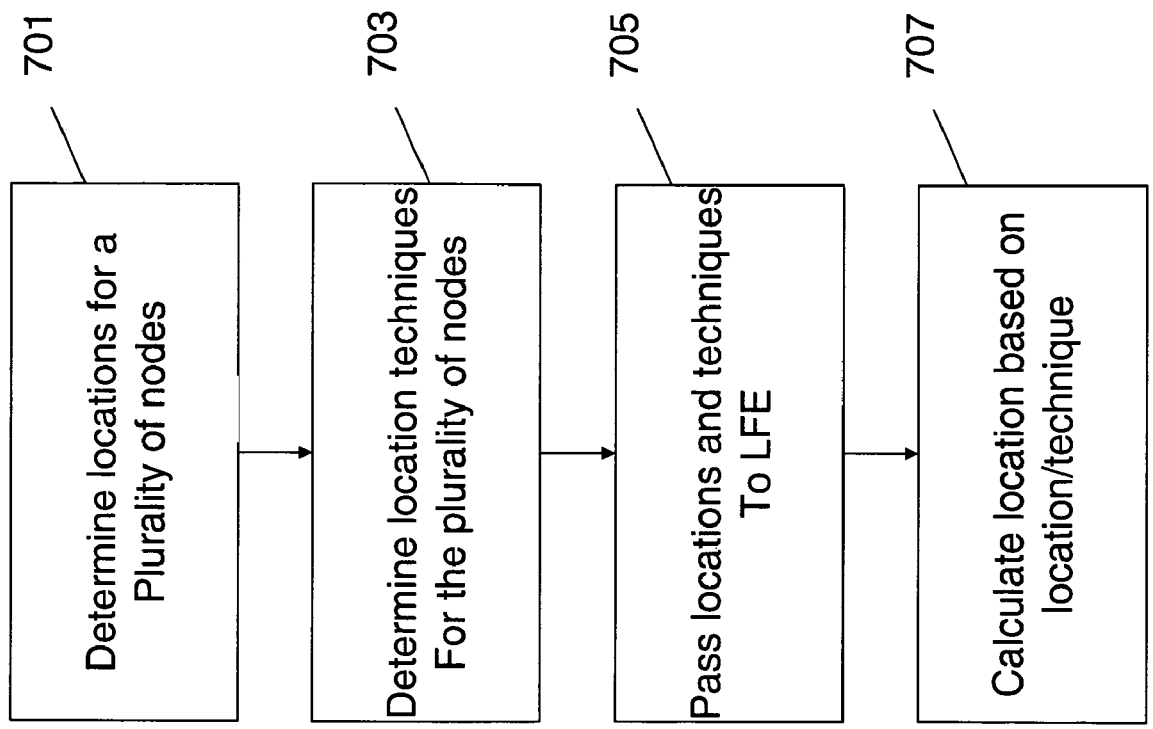
FIG. 7 is a flow chart showing operation of the node of FIG. 5.

FIG. 7 is a flow chart showing operation of node 500 wishing to determine its location based on other nodes location estimates and techniques. The logic flow begins at step 701 where logic circuitry 501 determines locations for at least one node from a plurality of nodes. Location techniques utilized for the at least one node from the plurality of nodes are determined by logic circuitry at step 703. As discussed above, the locations and the techniques are contained within packets received by the nodes.

Figure 8:
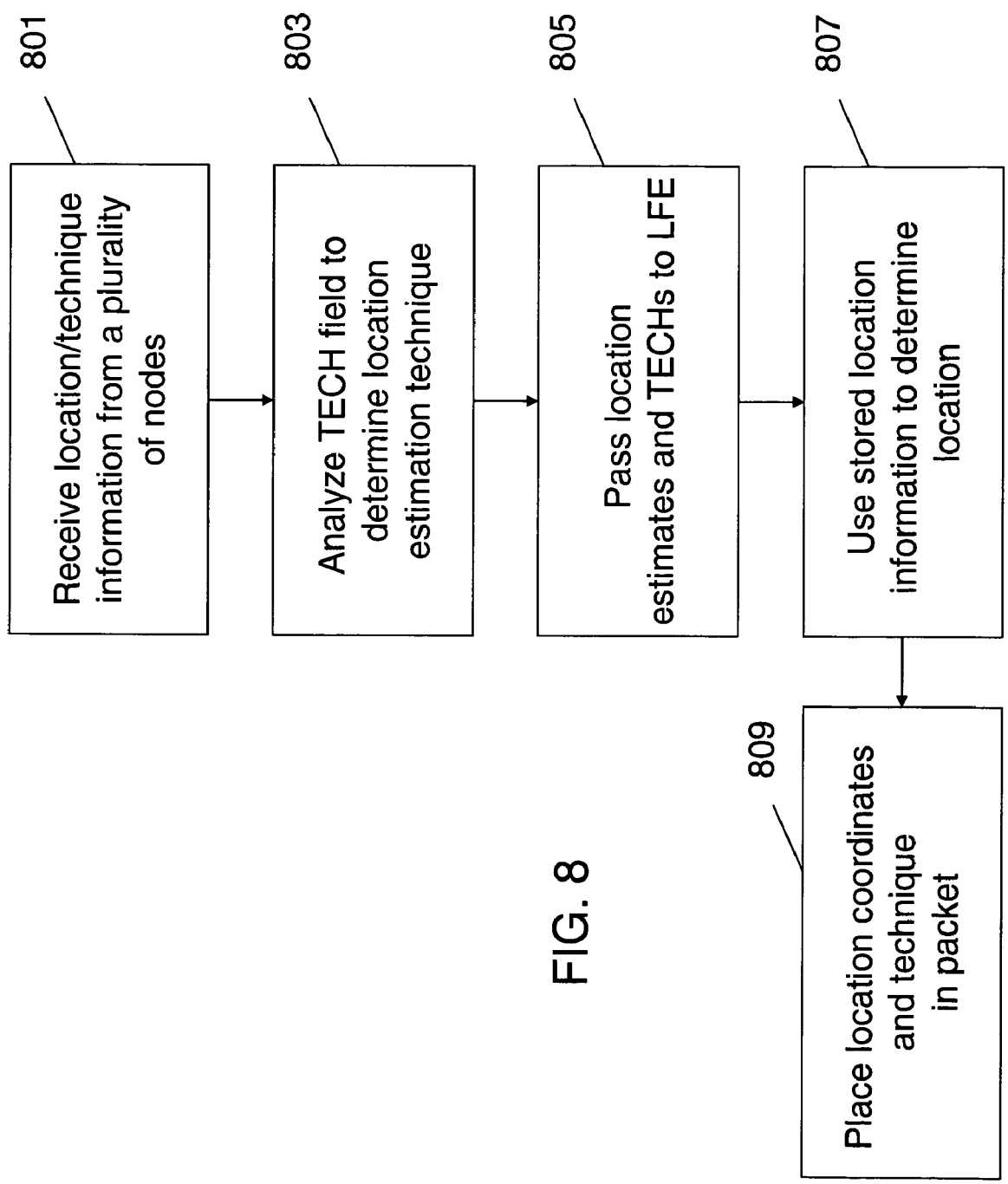
FIG. 8 is a flow chart showing operation of the node of FIG. 5.

At step 705 the locations and the location techniques are passed to LFE 503, where only certain locations are utilized in determining the node's location (step 707). More particularly, a location for a particular node from the plurality of nodes is utilized only when an appropriate location technique was used by the particular node (i.e., the location technique is from a predetermined set of techniques). The logic flow of FIG. 7 is illustrated in FIG. 8 with respect to using location estimates only from nodes that utilized a location estimation technique which can serve as a basis for an ML-based location estimation.

The logic flow begins at step 801 where location/technique information is obtained in packets by receiver 505 from a plurality of nodes and passed to logic circuitry 501. Logic circuitry 501 then analyzes TECH field 403 in the packets to determine the location technique utilized for the location received (step 803). At step 805 location estimates and techniques are passed to LFE 503 where they are stored in database 507. The stored location estimates are then utilized by LFE 503 in locating node 500 (step 807). More particularly, only those location estimates that were determined by an ML-based technique are utilized by LFE 503 in locating node 500. Finally, at step 809, logic circuitry 501 instructs transmitter 505 to transmit the node's location along with the technique used in determining the location. As discussed above, the location/technique information will be transmitted within packet 401.

While the invention has been particularly shown and described with reference to a particular embodiment, it will be understood by those skilled in the art that various changes in form and details may be made therein without departing from the spirit and scope of the invention. For example, the above description was given with nodes using an ML-based location technique restricting nodes that they use for locating themselves, however it is conceivable that nodes using other forms of location techniques will want to restrict nodes utilized in location. For example, a node wishing to locate itself may wish to utilize only nodes using very accurate location techniques. For instance, a node using a TDOA technique may utilize only nodes located via the very-accurate GPS technique. It is intended that such changes come within the scope of the following claims.

The invention claimed is:

1. A method for transmitting location data, the method comprising the steps of:
    performing a location estimate;
    determining a technique utilized for performing the location estimate; and
    transmitting the location estimate and the technique utilized for performing the location estimate to nodes within a communication system wherein the step of transmitting the location estimate and the technique comprises the step of transmitting the location estimate and the technique within a packet.

2. The method of claim 1 wherein the step of transmitting the location estimate and the technique utilized for performing the location estimate within the packet comprises the step of transmitting the location estimate and the location estimation technique within an ad-hoc network packet.

3. The method of claim 2 wherein the step of transmitting the location estimate and the technique within the ad-hoc network packet comprises the step of transmitting the location estimate and the technique within an IEEE 802.15.3 or an IEEE 802.15.4 ad-hoc network packet.

4. The method of claim 1 wherein the step of determining the technique utilized for performing the location estimate comprises the step of determining the technique from the group consisting of a manually measured technique, a weighted-average location technique, a path loss technique, a GPS technique, a Time-of Arrival (TOA) or Time-Difference of Arrival (TDOA) technique, a maximum-likelihood (ML) based technique, a closest neighbor technique, an Angle of Arrival Technique, a signal environment fingerprinting technique, and a multi-lateration technique.

5. The method of claim 1 wherein the step of performing the location comprises the steps of:
    determining locations of a plurality of nodes;
    determining a location estimate technique utilized for at least one node within the plurality of nodes; and
    utilizing a location for a particular node from the plurality of nodes in performing the location only when an appropriate location technique was utilized by the particular node.

6. The method of claim 5 wherein the step of utilizing the location estimate for the particular node comprises the step of utilizing the location estimate for the particular node only when a maximum likelihood based technique was utilized by the particular node.

7. An apparatus comprising:
    location-finding equipment for performing a location estimate;
    logic circuitry for determining a technique utilized for performing the location; and
    transmitting circuitry for transmitting the location estimate and technique utilized for performing the location, wherein the transmitting circuitry transmits the location estimate and the technique utilized for performing the location estimate within a packet.

8. The apparatus of claim 7 wherein the packet is an ad-hoc network packet.

9. The apparatus of claim 8 wherein the packet is an IEEE 802.15.3 or an IEEE 802.15.4 ad-hoc network packet.

10. The apparatus of claim 7 wherein the technique utilized for performing the location estimate is taken from the group consisting of a manually measured technique, a weighted-average location technique, a path loss technique, a GPS technique, a Time-of Arrival (TOA) or Time-Difference of Arrival (TDOA) technique, a maximum-likelihood (ML) based technique, a closest neighbor technique, an Angle of Arrival Technique, a signal environment fingerprinting technique, and a multi-lateration technique.

11. The apparatus of claim 7 wherein the location-finding equipment performs the location estimate by receiving location estimates from other nodes and utilizing the other nodes' location estimate in performing the location estimate.

12. The apparatus of claim 11 wherein the location-finding equipment performs the location estimate based at least on received location estimate technique identifiers and utilizing the techniques in performing the location estimate.

* * * * *